United States Patent [19]

Mason et al.

[11] Patent Number: 4,588,663
[45] Date of Patent: May 13, 1986

[54] LEVEL-ACID BATTERY HAVING AN IMPROVED TERMINAL PILLAR TO BATTERY LID SEAL

[75] Inventors: Anthony J. Mason, Market Harborough; Geoffrey J. May, Lutterworth; Michael Turner, Market Harborough, all of United Kingdom

[73] Assignee: Tungstone Batteries Limited, Leicestershire, England

[21] Appl. No.: 653,703

[22] Filed: Sep. 24, 1984

[30] Foreign Application Priority Data

Sep. 28, 1983 [GB] United Kingdom ............. 8325949

[51] Int. Cl.4 ............................................. H01M 2/30
[52] U.S. Cl. ..................................... 429/54; 429/181; 429/183
[58] Field of Search ............... 429/183, 181, 180, 184, 429/53-55, 87, 88, 185

[56] References Cited

U.S. PATENT DOCUMENTS

| 1,372,603 | 3/1921 | Cook | 429/183 |
| 1,386,946 | 8/1921 | Norris | 429/183 |
| 1,411,988 | 4/1922 | Cook | 429/183 |
| 1,505,219 | 8/1924 | Setzer | 429/161 |
| 4,053,693 | 10/1977 | Munch | 429/183 |
| 4,241,152 | 12/1980 | Klink | 429/181 |
| 4,294,896 | 10/1981 | Ueda | 429/86 |
| 4,447,508 | 5/1984 | Jensen | 429/86 X |

FOREIGN PATENT DOCUMENTS

| 1032852 | 6/1966 | United Kingdom . |
| 1427871 | 3/1976 | United Kingdom . |
| 1505425 | 3/1978 | United Kingdom . |

Primary Examiner—Anthony Skapars
Attorney, Agent, or Firm—Bernard, Rothwell & Brown

[57] ABSTRACT

A sealed gas recombining lead acid battery comprises a sealed lid, terminal pillars each located in a trough having a cylindrical side wall formed integrally with the lid and surrounding a terminal projecting through the lid, an annular sealing member located within the trough and surrounding the pillar, annular compression means surrounding the pillar and screw threadedly engaging a mating thread formed in said cylindrical wall of the trough, the compression means axially compressing the sealing member within the trough to press the sealing member radially against the pillar and the side wall of the trough, to effect a seal.

8 Claims, 9 Drawing Figures

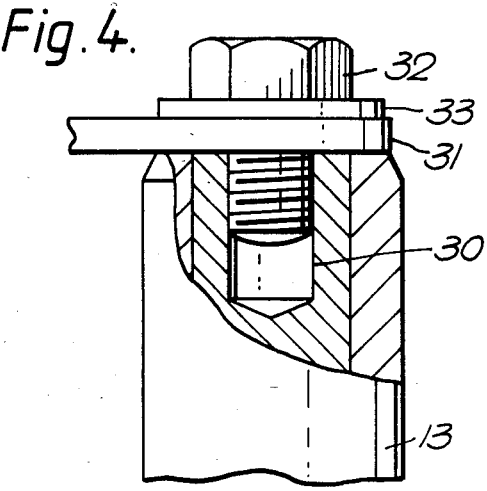
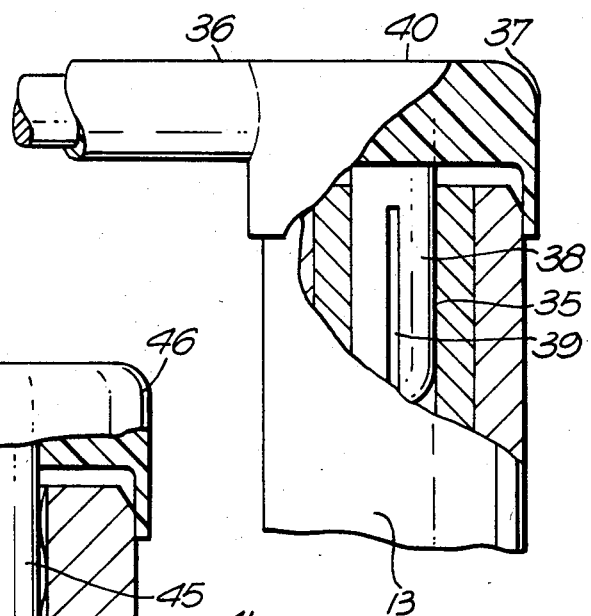
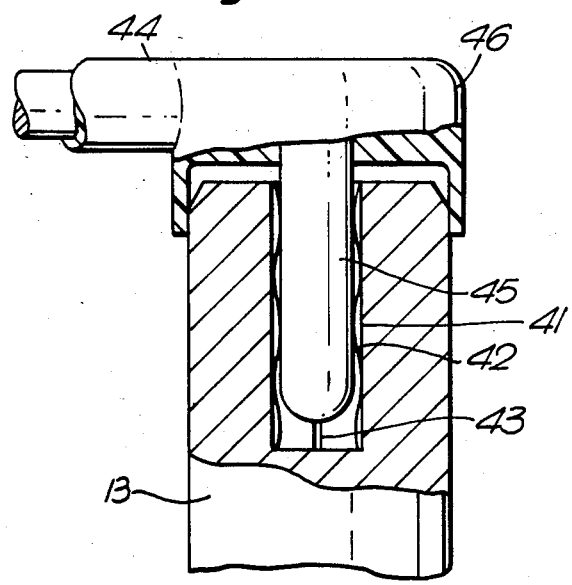

LEVEL-ACID BATTERY HAVING AN IMPROVED TERMINAL PILLAR TO BATTERY LID SEAL

BACKGROUND OF THE INVENTION

The present invention relates to electric batteries comprising at least one electric cell and more particularly to lead-acid batteries such as sealed, gas recombining lead-acid batteries which may for example be used in standby applications such as telephone exchanges, uninterruptable power supplies, power stations and emergency lighting systems.

Sealed gas recombining lead-acid batteries are already known. These batteries operate in such a manner that gases normally evolved on overcharge are chemically recombined, thus completely eliminating water loss. In a conventional lead-acid battery, water is electrolysed on overcharge liberating oxygen at the positive electrodes and hydrogen at the negative electrodes. In a sealed recombination cell, the stoichiometry of active materials is such that the positive plate becomes fully charged before the negative, and oxygen is liberated which diffuses to the negative plate where it reacts with lead to form lead oxide. The lead oxide then reacts with the sulphuric acid electrolyte to form lead sulphate and water. Oxygen transport from the positive to the negative plate is made possible by the use of a highly porous glass microfibre separator which is not fully saturated with electrolyte and allows oxygen to diffuse readily between the plates through interconnected pores free of electrolyte. The battery operates under an internal pressure and has a physically tight assembly, to ensure efficient recombination.

SUMMARY OF THE INVENTION

An object of the present invention is to provide a battery such as a sealed gas recombining battery having an improved terminal pillar to battery lid seal.

The present invention provides a sealed gas recombining lead acid and electric battery. comprising (a) a battery casing, (b) a battery lid sealed to said battery casing, (c) at least one cell compartment within the battery casing having battery plates, plate separator means and electrolyte, (d) terminal posts of opposite polarity electrically connected to the said battery plates and projecting through said battery lid to provide external electric connection to the battery and (e) sealing means to provide a seal between each terminal post and the battery lid, said sealing means comprising (1) a cylindrical trough, in which the terminal post is located, the trough being integrally formed in the lid and having a flange at its lower end, the flange surrounding the terminal post, (2) a compressible sealing member surrounding the terminal post within the trough and located above said flange, (3) a screw-threaded region on an upper part of the trough and (4) an externally screw-threaded clamping member surrounding the terminal post in the said upper part of the trough in scews-threaded engagement with the trough, said clamping member being arranged to bear against the compressible sealing member so that rotation of the clamping member to compress the sealing member causes the sealing member to extend radially and bear tightly against the terminal post and the trough thereby forming an effective seal between the post and the lid.

Preferably said battery lid has a flush upper surface with a plurality of finger holes located below said surface, said terminal posts being mounted in said troughs so that they do not project above said flush upper surface on the lid.

According to the present invention there is also provided a sealed electric battery comprising at least one electric cell, said battery including a sealed lid, terminal pillars each located in a trough having a cylindrical side wall formed integrally with the lid and surrounding a terminal projecting through the lid, an annular sealing member located within the trough and surrounding the pillar, annular compression means surrounding the pillar and screw threadedly engaging a mating thread formed in said cylindrical wall of the trough, the compression means axially compressing the sealing member within the trough to press the sealing member radially against the pillar and the side wall of the trough, to effect a seal.

Preferably the sealing member is sealed on an annular pillar centralising member disposed within the trough and surrounding the pillar to centralise the pillar within the trough, a side wall of the trough having an internal flange on which the centralising member sits.

Preferably an annular washer is disposed within the trough surrounding the pillar, the washer sitting on the sealing member and being engaged by the compression means and transmitting compression to the sealing member.

Preferably the surface of the washer and centralising member engaging the sealing member are chamfered to facilitate the radial pressure of the sealing member against the pillar and the side wall of the trough.

Preferably the compression means has an outer surface which is flush with the adjacent surface of the lid.

Preferably the compression means has an annular recess extending around the pillar and the washer has an axially extending annular spigot located within the recess.

Preferably the pillar has an outer end provided with a threaded post adapted to receive a connector and a nut for attaching the connector to the pillar between the nut and the pillar.

Alternatively the pillar may have an outer end which is provided with a threaded recess adapted to receive a bolt to attach a connector between the bolt and the pillar.

Alternatively the pillar may have an outer end which is provided with a recess adapted to receive a resilient split pin of a connector.

Alternatively the pillar may have an outer end which is provided with a recess containing a deformable resilient insert adapted to receive a pin of a connector.

Preferably the battery comprises a pressure relief valve adapted to permit excess gas within the battery to escape if gas pressure within the battery exceeds a predetermined amount.

Preferably the pressure relief valve comprises a member having aperture means which communicate with the gas inside the battery and which is covered by closure means, the arrangement being such that if the gas pressure exceeds a predetermined amount the gas forces the closure means to uncover the aperture means and permit excess gas to escape.

Preferably the pressure relief valve comprises a trough formed in the lid, the member provided with the aperture means being a hollow spigot communicating with the inside of the battery, the aperture means comprising a plurality of apertures opening radially around the periphery of the spigot, the closure means comprising a resilient cap covering the apertures, and a flame trap extending across the trough to prevent any sparks outside the device causing an explosion of the gases inside the battery, the arrangement being such that if the gas pressure within the device exceeds a predetermined amount excess gas forces the cap to uncover the apertures and permit the gas to escape through the flame trap.

Preferably the flame trap comprises a porous sintered polyethylene disc.

Preferably the battery comprises a plurality of cells each separated by a partition and each containing a plurality of positive and negative plates, each positive plate being disposed adjacent a negative plate and each plate being separated from an adjacent plate by separating material having a porosity sufficient to permit oxygen to pass from the positive to the negative plates.

Preferably the separator material comprises glass fibre.

BRIEF DESCRIPTION OF THE DRAWINGS

FIG. 4 is a partially cut away view of a second embodiment of a terminal pillar and a terminal connector fixed to the pillar by means of a bolt, FIG. 6 is a partially cut away view of a third embodiment of a terminal pillar and a terminal connector fixed to the pillar by means of a split pin on the connector located in a recess of the pillar, FIG. 7 is a partially cut away view of a fourth embodiment of a terminal pillar and a terminal connector fixed to the pillar by means of a pin on the connector located in a resilient sleeve in the pillar.

DESCRIPTION OF THE PREFERRED EMBODIMENTS

Figure 1:
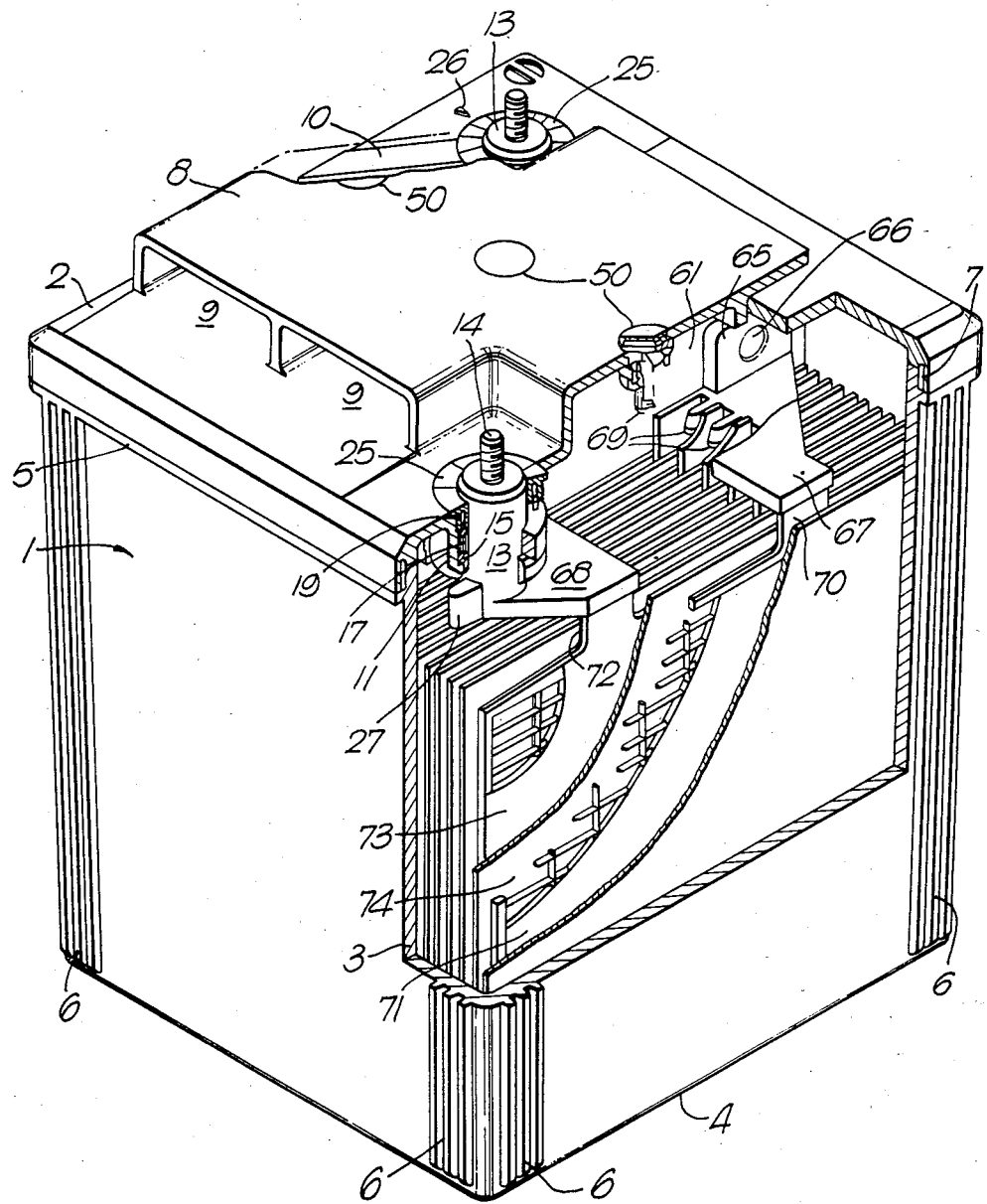
FIG. 1 is a perspective view of a battery according to the present invention, partially cut away to show the internal construction.

FIG. 1 shows a sealed, gas recombining lead-acid battery having a rectangular casing 1 and lid 2 made from a flame retardant grade ABS (acryonitrile-butadiene-styrene copolymer) plastics material, each moulded as a single unit. The casing 1 has substantial side walls 3 and base 4 to withstand internal pressures. Near the top of the side walls 3 of the casing 1 is an integral horizontal rib 5. This rib 5 acts both as a positive stop for the lid when the lid 2 is heat sealed to the casing 1 and as a secondary means of lifting the battery without stressing the sealed joint between the casing 1 and the lid 2. The casing 1 also has vertical ribs 6 at each corner each rib being wider than the space between each rib 6 so that corresponding sets of ribs 6 on adjacent batteries cannot mesh together. This arrangement of the ribs 6 enables adjacent batteries to touch but still have room to swell slightly under internal pressure without coming into contact with each other. The ribs 6 also allow vertical stacking of batteries on their sides or ends.

The casing 1 is divided into three cell compartments, one for each cell, by two vertical partition walls which are integrally moulded with the casing 1, one wall 61 being shown in FIG. 1.

The battery lid 2 is fixed to the casing 1 by heating the upper edges of the casing side walls 3 and partition walls and the corresponding portions of the lid 2 with a suitable tool until they are partially melted. The lid 2 and casing 1 are then brought together under slight pressure to form the seal between the casing 1 and the lid 2. The partition walls 61 are also heat sealed to the lid 2 thereby producing an independent seal around each cell of the battery. The lid 2 includes a peripheral skirt 7 which conceals unsightly beads of plastics material resulting from the heat sealing operation. The battery lid 2 also comprises a raised portion 8 which provides a flush finish to the upper surface of the battery. The portion 8 defines recesses 9 between the body of the lid 2 and the upper flat surface of the portion 8. These recesses 9 provide finger holds and the portion 8 extends across only part of the width of the lid so that batteries can be placed adjacent each other without risk of fingers being trapped. Two raised lands 10 (only one of which is shown) are provided on the lid at diagonally opposite sides to indicate the correct routing of the inter cell connections.

The lid 2 is provided with terminal posts each located in an integrally moulded cylindrical trough 11 as more clearly seen in FIGS. 2 and 3, so as to lie below the upper surface of the flush portion 8. The cylindrical wall of each trough has an internal annular flange 12. Extending through the trough 11 is a terminal pillar 13 which at its upper end is provided with a threaded brass post 14 and at its lower end is connected to electrical plates located within the battery. (as described below). The clearance between the terminal pillar 13 and the annular flange 12 is approximately 5 mm. This clearance enables the trough 11 to pass over the terminal pillar 13 unimpeded during location of the lid on the casing 1 for heat sealing, otherwise a faulty casing lid seal could occur which could mean that the battery would have to be scrapped.

Figure 2:
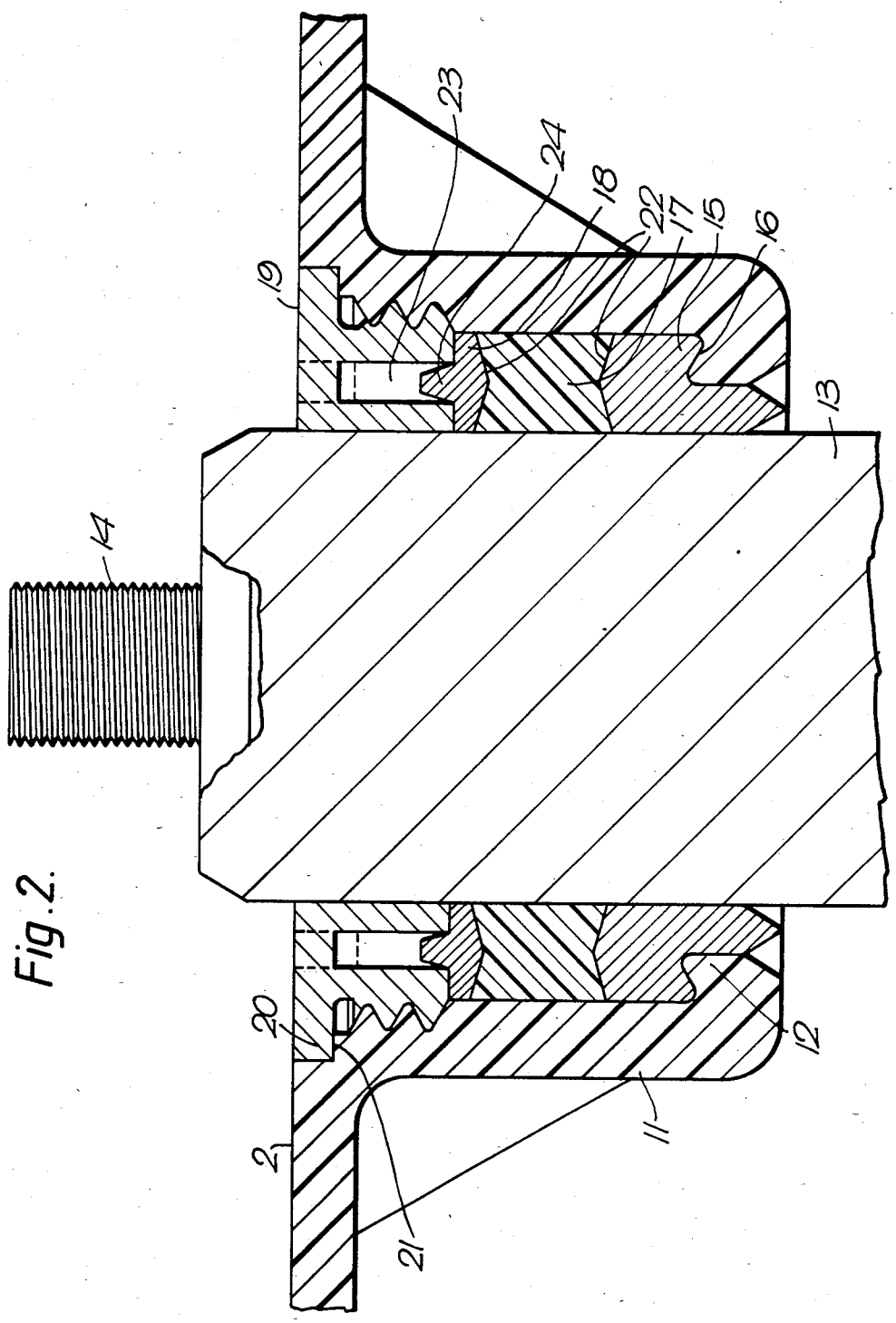
FIG. 2 is an enlarged partially cut away view of a terminal pillar and the adjacent portion of the battery lid shown in FIG. 1, illustrating the terminal pillar to battery lid sealing arrangement.

As shown more clearly in FIG. 2, a ring 15 is located in the trough 11 and closely surrounds the pillar 13. This ring 15 ensures concentricity between the trough 11 and the pillar 13. The ring 15 is provided with an annular shoulder 16 which locates on the flange 12. The shoulder 16 and flange 12 are inclined at complementary angles which tend to resist any tendency for the lid to "creep" outwards throughout its life. As an additional safeguard six external radial webs are provided in the lid 2 around the trough 11. The centralising ring 15 supports an annular neoprene nitrile seal 17 which surrounds the pillar 13. On the seal 17 sits a compression washer 18 which also surrounds the pillar 13. A clamping nut 19 surrounding the pillar is screwed by a spigot spanner into an upper threaded part of the trough 11 until its upper flange 20 bottoms on a step 21 in the trough 11. At this position the top of the clamping nut 19 is flush with the surrounding surface of the lid 2 and the seal 17 is compressed between the centralising ring 15 and the compression washer 18 thereby pressing radially against the wall of the trough and the pillar. The surfaces of the compression washer 18 and centralising ring 15 engaging the seal 17 are each provided with a double chamfer 22 to facilitate the radial pressing of the seal 17 against the pillar 13 and the cylindrical wall of the trough 11. For ease of moulding the clamping nut 19 has an annular slot 23 to reduce its thickness. The compression washer 18 is provided on its upper edge with an annular spigot 24 surrounding the pillar, which spigot locates inside the slot 23 in the clamping nut to prevent the slot 23 constricting under pressure.

An adhesive label 25 (FIGS. 1 and 3) is provided around the pillar 13 on top of the clamping nut 19. This label indicates the polarity of the terminal, gives information regarding the cell type and date of manufacture and covers holes in the clamping nut 19 for the spigot spanner to reduce any tendency to tamper with the seal in service. On the positive terminal pillar 13 is a projection 27 (FIG. 1) which fouls on a spigot (not shown on the underside of the battery lid if the lid is incorrectly orientated prior to heat sealing the lid 2 to the casing 1. This prevents the lid 2 being accidently reversed on the casing. To make electrical connection to the battery an apertured plate (not shown) of a cable connector is passed over the post 14 and a nut (not shown) is threaded onto the post 14 and screwed down to tighten the plate against the top of the pillar 13 thereby providing a good electrical connection between the cable and the pillar 13. The above arrangement allows an effective seal between each terminal post and the lid to be made after the lid is sealed to the battery casing by rotation of the nut 19 in the screw threaded trough thereby causing axial compression of the sealing elements in the trough. Due to the lower flange 12 at the base of the trough the axial compression is resisted causing the sealing elements to expand radially and press tightly against the cylidrical wall of the trough and around the pillar 13 thereby forming a tight seal.

Figure 3:
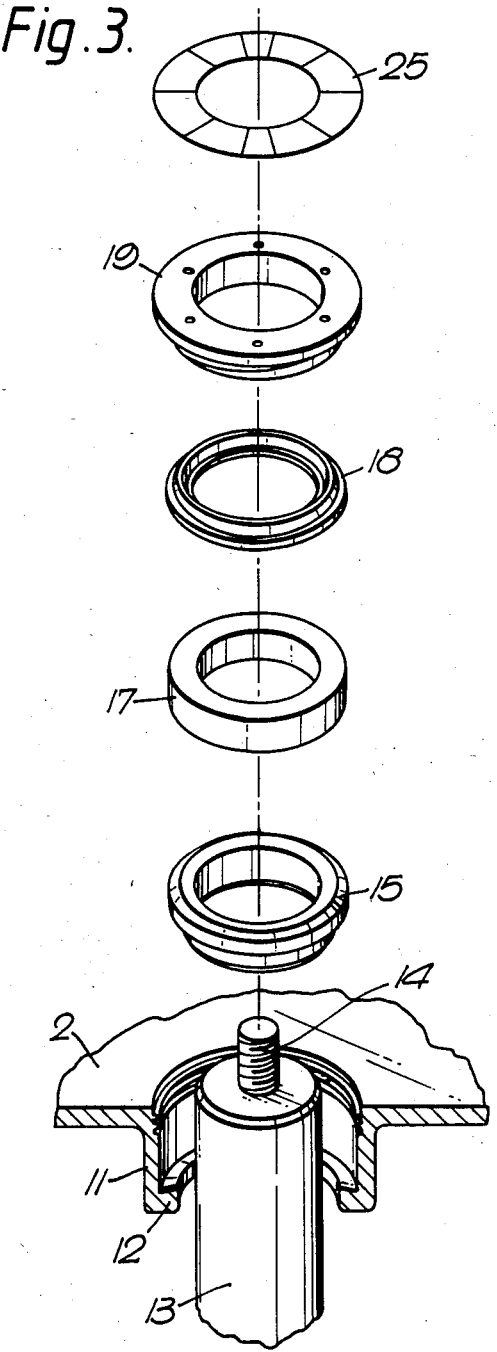
FIG. 3 is a perspective exploded view of FIG. 2 showing the elements of the sealing arrangement.
Figure 5:
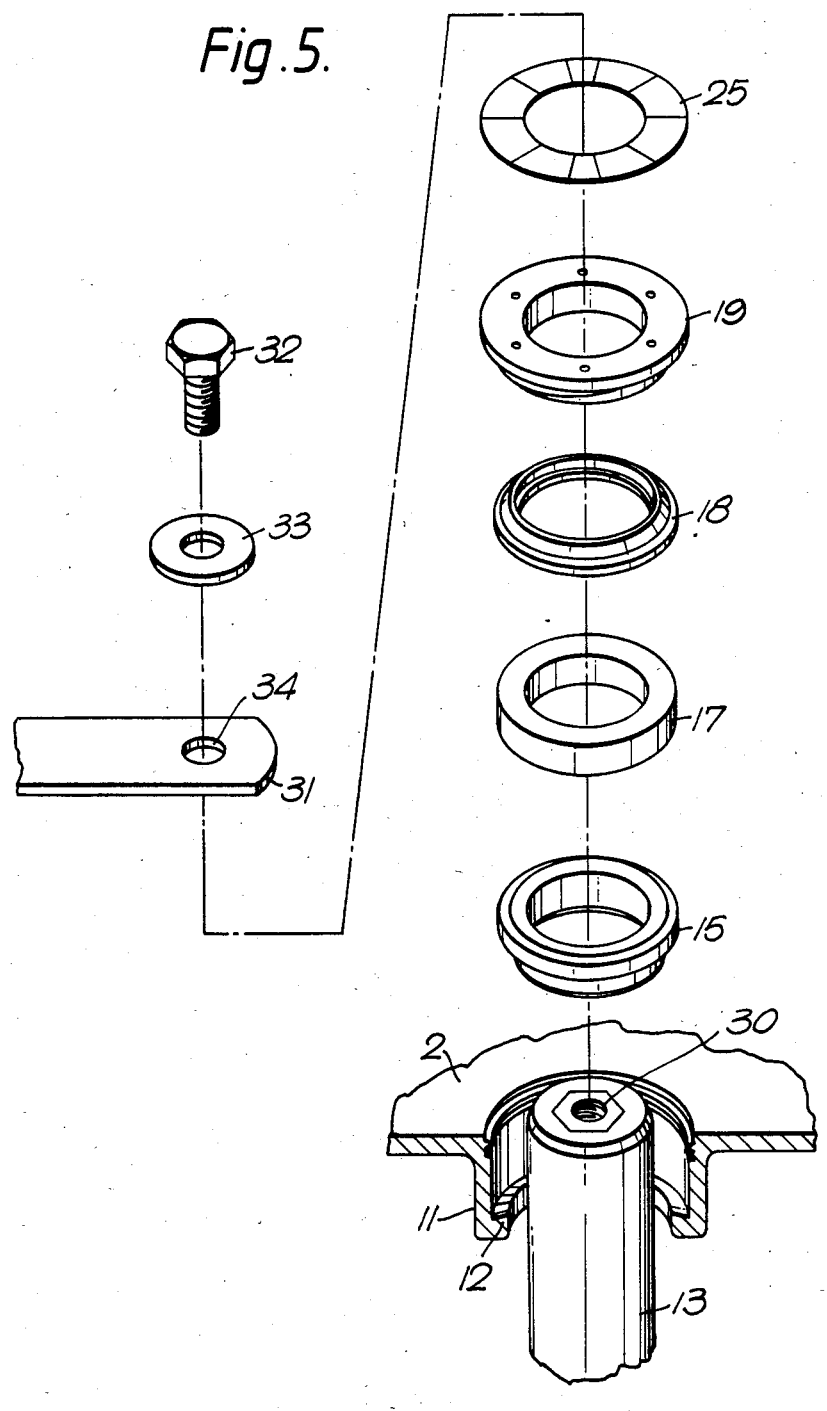
FIG. 5 is a perspective exploded view of FIG. 4 showing the sealing arrangement between the pillar and the battery lid.

FIGS. 4 and 5 show a second embodiment of a terminal pillar 13 which is similar to the pillar shown in FIGS. 2 and 3 except that the pillar 13 is provided with a threaded recess 30 or insert instead of the post 14 and a terminal connector 31 is attached to the pillar 13 by means of bolt 32 which passes through a washer 33 and a hole 34 in the connector and screwed into the threaded recess or insert 30 in the pillar 13.

FIG. 6 shows a third embodiment of a terminal pillar 13 which has the same sealing arrangement as FIG. 3. The pillar 13 has a non-threaded recess 35 in its top and a terminal connector 36 is provided with a cap 37 having a hollow pin 38 which has a longitudinally extending slot 39 opening at the tip of the pin 38. The diameter of the pin 38 is slightly greater than the diameter of the recess 35 in pillar 13 so that when the connector cap 37 is pushed onto the top of the pillar 13 and the pin 38 thereby inserted in the recess 35 in the pillar 13 the slot 39 in the pin 38 allows the pin 38 to be slightly reduced in diameter and so resiliently engage the walls of the recess 35. The diameter of the pin 38 and recess 35 are such that a good electrical connection is provided between the connector pin 38 and the terminal pillar 13. In order to prevent dirt coming into contact with the connection the connector is provided with a boot 40 of for example rubber.

FIG. 7 shows a fourth embodiment of a terminal pillar 13 which has the same sealing arrangement and is provided with recess 41 in which is located a corrugated sleeve 42 having a slot 43 extending along its entire length. The connector 44 is similar to that shown in FIG. 6 except that it is provided with a pin 45 which does not have a slot. When the connector cap 46 is pushed onto the top of the pillar 13 the pin 45 opens the slot in the sleeve 42 and pushes the sleeve 42 radially against the wall of the recess 41 to provide a tight connection between the connector 44 and the pillar.

Figure 8:
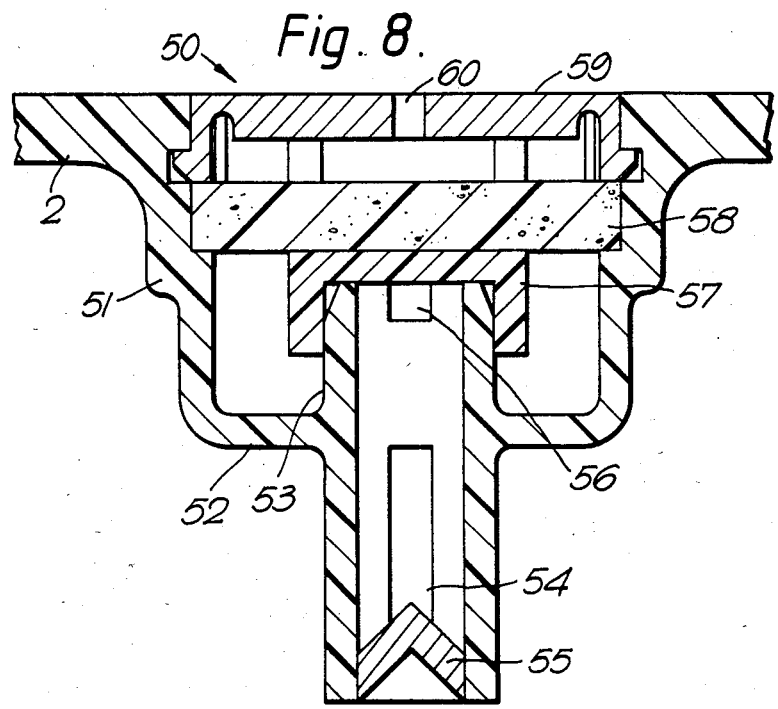
FIG. 8 is a cross-sectional view of the battery pressure relief valve shown in FIG. 1.
Figure 9:
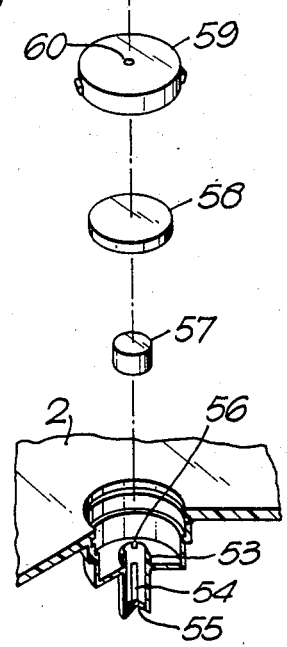
FIG. 9 is a perspective exploded view of the elements of the pressure release valve shown in FIG. 8.

Incorporated in the lid are three pressure relief valves 50 of the Bunsen type as shown in FIGS. 8 and 9. Each valve is associated with a respective cell and comprises a trough 51 integrally moulded in the lid 2. The base 52 of the trough is provided with a hollow cylindrical spigot 53 which extends into the casing 1. At its lower end the spigot 53 is provided with an opening 54 through which electrolyte passes when the battery is being evacuated and filled. Within the spigot 53 adjacent the opening 54 is a roof shaped electrolyte deflector 55 for preventing a jet of electrolyte impinging directly on relatively fragile separator material in the casing during filling. The upper end of the spigot 53 is provided with a plurality of circumferentially spaced holes 56. These holes 56 are covered by a neoprene nitrile cap 57 which is held in place by a porous sintered polyethylene disc 58 extending across the trough 51. A non-removable clip-on valve cover 59 is located across the top of the trough 51. If excess gas pressure, for example 35 kPa, develops in the battery as a result of gross overcharging or excessively high temperatures the gas passes through the opening 54 at the lower end of the spigot 53, up through the spigot and forces the cap 57 to uncover the holes 56 at the top of the spigot 53. The gas then passes upwards through the disc 58 and out of the battery through a hole 60 in the cover. The disc 58 acts as a flame trap and ensures that any sparks which may occur outside the battery when excess gas is escaping cannot cause an explosion within the battery.

The three cells of the battery each separated by a partition 61 (only one of which is shown in FIG. 1) integrally moulded with the casing 1. Each cell contains five positive plates 73 interleaved with six negative plates 71 separated from one another by a double layer of microfibre glass paper separator material 74 overlapping the plates at all their edges. Electrical connection between each cell is provided by means of a lead alloy intercell link member 65 which is extruded through a suitably located pre-punched hole in the intercell partition 61. When the extruded lead alloys from each side of the partition touch, an electrical resistance weld 66 is made. The bases 67 and 68 respectively of the intercell link and terminal pillar 13 are cast with integral fingers. Only the fingers 69 of one intercell link 61 and none of the fingers of the terminal pillars 13 are shown. The fingers 69 of the intercell link member 65 are located between lugs 70 of each negative plate 71 and each finger 69 is fixed to each lug 70 of a negative plate 71. The fingers of the terminal pillar 13 are located between lugs 72 of the positive plates 73 and each finger of the terminal pillar is fixed to each lug 72 of a positive plate 73. This ensures that in the unlikely event of excessive corrosion, individual plates, not the whole group of plates would become detached, thus preventing complete battery failure.

Each cell of the battery has a nominal capacity of 100 Ah and the five positive plates 73 and six negative plates 71 and are separated from one another by the separator which comprises a double layer of microfibre glass paper 74, overlapping the plates at all their edges.

The separator 74 provides a sufficiently large and uniform void volume in order to achieve satisfactory oxygen recombination efficiency. A suitable material which is commercially available for sealed, gas recombining lead-acid cells, is produced by a paper making process and utilises microfibre borosilicate glass fibres. Such a material, having a basis weight of 200 g/m², a thickness of 1.35 mm (when compressed by a pressure of 10 kPa), and a porosity of 95% (when compressed to 1.35 mm), is particularly suitable.

Both the positive 73 and negative plates 71 are produced by a pasted grid method. The grids have as high a hydrogen overpotential as possible, consistent with the ability to support their own weight. Particularly suitable in these respects are grids cast from an alloy containing nominally 0.09% calcium, 0.3% tin, with the balance being lead. The paste densities used are 4.1 g/cm³ for the positive plates 73 and 4.35 g/cm³ for the negative plates 71, both based upon the wet, unformed paste weight. The pastes are produced by mixing a lead oxide with sulphuric acid, water and other additives. The lead oxide is produced by attrition in rotating ball mills. The positive paste comprises a mixture of lead oxide, sulphuric acid and water together with a small quantity of polyester fibre which improves the mechanical properties of the active material. The negative paste also comprises a mixture of lead oxide, sulphuric acid, and water, but also contains other additives to improve processing and active material performance. These additives are precipitated barium sulphate, carbon black (an amorphous carbon also known as lamp black), an acid-insoluble sodium lignosulphonate which helps to maintain active material porosity and a fatty acid mixture that prevents oxidation of the active material on drying. The positive plates 73 are 3.7 mm thick and the negative plates 71 are 2.6 mm thick. Both the positive and negative plates are 175 mm wide and 150 mm high. The individual positive and negative plates are formed in vats containing sulphuric acid with a specific gravity of 1.030. The plates are then formed for a sufficient time and charge input to ensure they are clear of residual lead sulphate. The formed plates are then washed free of acid, and dried. Precautions are taken to ensure that the active negative material does not oxidise during the drying operation. Alternatively, formation may be carried out in the casing 1 after assembly but prior to the final sealing of the cells with a vent cap. In this method it is advantageous to use a formation electrolyte which has been pre-cooled to some degree.

Each positive plate 73 contains a nominal weight of 293 g of dry formed material and each negative plate 71 contains a nominal weight of 196 g of dry formed material.

The volume available for paste on each positive plate 73 is 79.43 cm³.

The bulk density of the dry formed positive material is thus 293÷79.43 i.e. 3.69 g/cm³. The true density of $PbO_2$ is 9 g/cm³, which means that the pore volume is 59% of the geometric volume or 79.43×0.59 i.e. 46.86 cm³ per plate or 46.86×5 i.e. 234.3 cm³ per cell.

The volume available for paste in each negative plate 71 is 56.24 cm³. The bulk density of the dried formed negative material is thus 196 ÷56.24 i.e. 3.49 g/cm³. The true density of lead is 11.3 g/cm³, which means that the pore volume of the negative material is 69% of the geometric volume or 56.24×0.69 i.e. 38.81 cm³ per plate or 38.81×6 i.e. 232.9 cm³ per cell.

The glass fibre separator material 74 has a basis weight of 200 g/m² and the glass fibres have a true density of 2.69 g/cm³. The separator 74 in each cell is compressed to a thickness of 0.94 mm per sheet. The bulk density of the separator 74 in the cell is thus 0.213 g/cm³, giving a porosity of 92%. The total volume of separator 74 in each cell is 626.5 cm³, giving a pore volume of 626.5×0.92 i.e. 576.4 cm³.

Each cell is evacuated and filled, via a pressure relief valve body, with sulphuric acid having a specific gravity of 1.300. In order that oxygen can be efficiently transported from the positive plate 73 to the negative plate 71, the separator 74 must not be fully saturated. The volume of acid is therefore, calculated on the basis of the sum of the pore volumes of the positive and negative active materials, plus 95% of the pore volume of the separator 74. The volume of acid per cell is thus 234.3+232.9+(0.95×576.4) i.e. 1015 cm³ or approximately 10 cm³ per Ah of nominal capacity.

Alternatively, the cells may be overfilled with sulphuric acid of a lower specific gravity and sufficient water electrolysed off to bring the volume and specific gravity to the correct values.

The battery is finally sealed by fitting the pressure relief valve to each cell.

We claim:

1. A sealed gas recombining lead acid electric battery comprising
   (a) a battery casing,
   (b) a battery lid sealed to said battery casing,
   (c) at least one cell compartment within the battery casing having battery plates, plate separator means and electrolyte,
   (d) terminal posts of opposite polarity electrically connected to the said battery plates and projecting through said battery lid to provide external electric connection to the battery and
   (e) sealing means to provide a seal between each terminal post and the battery lid, said sealing means comprising
      (1) a cylindrical trough having an axis, in which trough the terminal post is located, the trough being integrally formed in the lid and having a flange at its lower end, the flange surrounding the terminal post and having a surface inclined to the trough axis,
      (2) a compressible sealing member the terminal post within the trough and located above said flange,
      (3) a screw-threaded region on an upper part of the trough,
      (4) an annular pillar centralising member disposed within the trough and surrounding the pillar to centralise the pillar within the trough, said pillar centralising member being located between said sealing member and said inclined flange formed on a side wall of the trough so as to support said centralising member, the centralising member having a surface adapted to conform to said inclined surface of the flange,
      (5) an annular washer located within the trough and surrounding said pillar, said washer being located on top of said sealing member, and,
      (6) an externally screw-threaded clamping member surrounding the terminal post in the said upper part of the trough in screw-threaded engagement with the trough, said clamping member being arranged to bear against said annular washer so that rotation of the clamping member to compress the sealing member causes the sealing member to be compressed axially and thereby extend radially and bear tightly against the terminal post and the trough forming an effective seal between the post and the lid.

2. A sealed battery according to claim 1 in which said battery lid has a flush upper surface with a plurality of finger located below said surface, said terminal posts being mounted in said trough so that they do not project above said flush upper surface on the lid.

3. A sealed battery according to claim 1 in which said washer and centralising member each have faces bearing against the sealing member, each said face having two regions of appropriate inclination relative to the axis of the trough so as to facilitate radial pressure of the sealing member against the pillar and the wall of the trough when the sealing member is axially compressed.

4. A sealed batter according to claim 1 in which said compression means has an outer surface flush with an adjacent surface of the lid.

5. A sealed battery according to claim 1 in which said compression means has an annular recess extending around the pillar and opening towards said washer, said washer having an axially extending annular spigot located within said recess.

6. A sealed battery according to claim 1 further including pressure relief valve means adapted to permit excess gas within the battery to escape if gas pressure within the battery exceeds a predetermined amount, said pressure relief valve means including a flame trap device to prevent ignition of gases inside the battery.

7. A sealed battery according to claim 1 in the form of a sealed gas recombining lead acid electric battery, said battery having a plurality of cells each separated by a partition and each containing a plurality of positive and negative plates, each positive plate being disposed adjacent a negative plate and separated from an adjacent plate by separating material having a porosity sufficient to permit oxygen to pass from the positive to the negative plate.

8. A sealed battery according to claim 6 wherein the pressure relief valve comprises a one-way pressure opening valve and said flame trap device comprises a flama-retarding disc.

* * * * *